(12) United States Patent
Gauthier et al.

(10) Patent No.: US 6,492,061 B1
(45) Date of Patent: Dec. 10, 2002

(54) COMPOSITE TREATMENT WITH LIPO$_3$

(75) Inventors: Michel Gauthier, La Prairie (CA); Simon Besner, Côteau-du-Lac (CA); Michel Armand, Montreal (CA); Jean-François Magnan, Montreal (CA); Pierre Hovington, Montreal (CA)

(73) Assignees: Hydro-Quebec, Quebec (CA); Minnesota Mining and Manufacturing Company, St. Paul, MN (US)

( * ) Notice: Subject to any disclaimer, the term of this patent is extended or adjusted under 35 U.S.C. 154(b) by 0 days.

(21) Appl. No.: 09/544,134

(22) Filed: Apr. 6, 2000

(30) Foreign Application Priority Data

Apr. 7, 1999 (CA) .............................................. 2268346

(51) Int. Cl.$^7$ ................................................ H01M 4/62
(52) U.S. Cl. ...................................... 429/212; 429/232
(58) Field of Search ................................ 429/212, 217, 429/232

(56) References Cited

U.S. PATENT DOCUMENTS

| | | | |
|---|---|---|---|
| 3,042,732 A | * 7/1962 | Kordesch | 429/217 |
| 4,810,599 A | * 3/1989 | Kondo et al. | 429/212 X |
| 5,378,560 A | * 1/1995 | Tomiyama | 429/217 |
| 5,580,686 A | 12/1996 | Shi et al. | 429/245 |
| 5,585,208 A | * 12/1996 | Lian et al. | 429/232 X |
| 5,705,291 A | 1/1998 | Amatucci et al. | 429/137 |
| 5,856,045 A | 1/1999 | Fauteux et al. | 429/232 |
| 6,291,102 B1 | * 9/2001 | Yoshida et al. | 429/232 X |

\* cited by examiner

Primary Examiner—Stephen Kalafut
(74) Attorney, Agent, or Firm—Katten Muchin Zavis Rosenman (57) ABSTRACT

The present invention concerns a lithium electrochemical generator including at least one composite electrode comprising an active material and a first and second solid electrolytes non-homogeneously distributed into the composite. The first solid electrolyte is of mineral nature, vitreous or partly vitreous, and is a specific conductor of lithium ions, and is preferably localized on the surface of the particles of active materials of the electrode. The second solid electrolyte is organic, comprises a dry or gelified polymer electrolyte conducting ions surrounding the dispersed solid phases and acts as a deformable binder, preferably elastomeritically, of the composite in contact also with the collector and the separator electrolyte of the generator. A thin layer of the first electrolyte wets and coats at least a part of the surface of the active material particles to protect the coated surface of passivation or degradation reactions induced by the second electrolyte, and to maintain a good quality of ionic and electronic exchanges between the active material of the electrode and the other components of the composite, the first electrolyte being impermeable to the components of the second electrolyte.

31 Claims, 5 Drawing Sheets

Composite electrode after cycling showing possible areas wherein passivation films are formed

Figure 1a

Composite electrode before cycling

Figure 1b

Composite electrode after cycling showing possible areas wherein passivation films are formed Composite electrode before cycling

Composite electrode after ageing of interfaces (location of passivation films)

Figure 3a

Composite electrode before cycling

Figure 3b

Agglomerated composite electrode after formation of passivation films

COMPOSITE TREATMENT WITH LIPO$_3$

FIELD OF INVENTION

The present invention concerns a lithium electrochemical generator comprising at least one composite electrode comprising an active material and a first and second solid electrolytes non-homogeneously distributed into the composite. The first solid electrolyte is mineral, vitreous or partly vitreous, is a specific conductor of lithium ions, and is preferably localized on the surface of the particles of active materials of the electrode. The second solid electrolyte is organic, comprises a dry or gelified polymer electrolyte that is a mixed conductor conducting ions surrounding the dispersed solid phases and acting as a deformable binder of the composite in contact also with the collector and the separator electrolyte of the generator. A thin layer of the first electrolyte wets and coats at least part of the surface of the active material particles to protect the coated surface of passivation or degradation reactions induced by the second electrolyte, and to maintain the quality of ionic and electronic exchanges between the active material of the electrode and the other components of the composite, the first electrolyte being impermeable to the components of the second electrolyte.

BACKGROUND OF THE INVENTION

Polymer electrolytes are particularly desirable for the manufacturing of lithium accumulator using composite electrodes wherein the electrode materials are dispersed in the polymer matrix, that acts then as an ion conductor and as a deformable binder of the active matter powders. With such electrolytes, it is possible to control the elastomericity and the adhesion of the binding electrolyte in contact with the solids. These systems therefore allow the absorption, without any damage, of volume variations of the electrode materials.

Polymer electrolytes-based composite electrodes can be of two types, namely dry solvating type working at elevated temperatures, generally with lithium anodes; or gelified type, solvating or not, working at room temperature because of the addition of polar aprotic liquid solvents in association with electrodes of the lithium-ion type having cathodes working under high voltages (~4V). However, whatever their type, such composite electrodes age during cycling and/or with time. This ageing produces undesirable chemical or electrochemical reactions localized at the surface of the particles of active matter, at the surface of the collectors, and in certain instances, at the surface of the electronic conduction additive. This phenomenon, generic to lithium generators with organic electrolytes, causes the formation of passivation or degradation films on the surfaces where the ionic and electronic exchanges take place. The efficiency of the generators is therefore greatly impaired.

Figure 1:
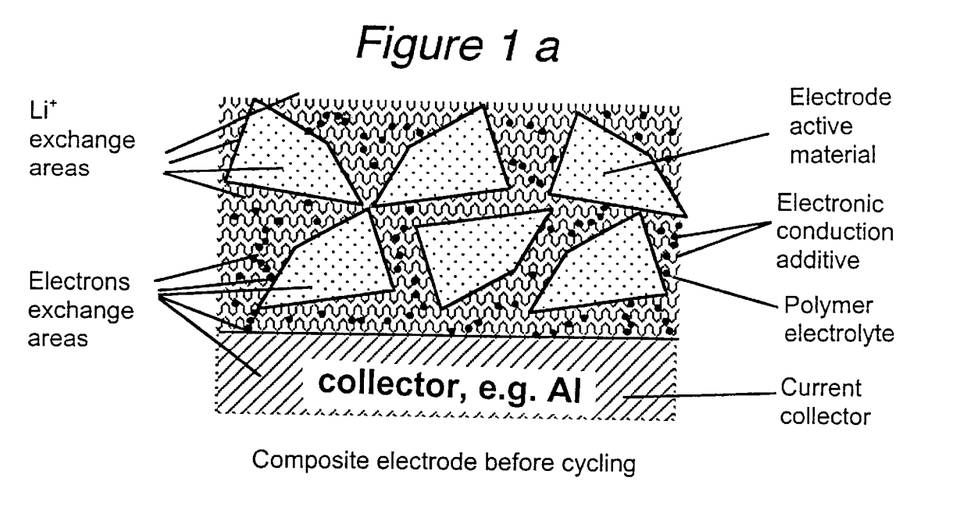
FIG. 1a illustrates a composite electrode before cycling.
FIG. 1b illustrates the formation of passivation layers on a composite electrode after cycling.

In polymedric media, these phenomena are amplified because in the solid state, the products formed by the reaction of the solvent, the salt and the electrode material have a tendency to accumulate because of the lack of convection, and are not compensated by the penetrating power of the liquid electrolytes that can maintain the exchanges at the interfaces because of their penetration power through the passivation or degradation films. The phenomena observed are electrochemical decompositions initiated by radicals, acid-base reactions, or oxidation-reduction reactions more or less catalysed by the materials present. FIGS. 1a) and 1b) illustrate the possible localization of passivation films on the various interfaces where the ionic and electronic exchanges take place.

It is therefore frequent in an organic solid medium to see an increase of transfer resistance at the interfaces, in addition to the limitation phenomena of ion diffusion at the electrodes. The films formed at the interfaces are sometimes detectable by electronic microscopy and can reach a few hundreds of nanometers. In other cases, the degradation reactions cause the breaking of the crystalline structure at the surface of the active phases, or cause the formation of soluble species harmful to the proper operation of the generator.

The reactions between crystalline or vitreous solids, for example between an oxide or a cathode chalcogenide and a vitreous electrolyte, are generally slower, and these systems are known for their stability versus time, temperature and operating voltage. The disadvantage of mineral solid electrolytes, crystalline or vitreous, is however their rigidity and fragility, which does not allow them to resist to electrode volume variations caused by cycling.

SUMMARY OF THE INVENTION

In accordance with the present invention, there is now provided an electrochemical generator, preferably a lithium electrochemical generator, comprising a cathode and an anode wherein at least one of them is a composite electrode comprising an active material, preferably in the form of dispersed particles, a current collector, and at least a first an a second solid electrolyte preferably non-homogeneously distributed in the composite, the first and the second electrolyte optionally comprising one or more dispersed electronic conduction additive. The first electrolyte comprises a mineral solid conductor, vitreous or partly vitreous, localized at the surface of the particles of the active material. The second electrolyte comprises an organic solid preferably comprising a dry or gelified polymer electrolyte which is a mixed conductor of ions surrounding the solid phases dispersed and acting as a deformable binder of the composite in contact also with the collector and the separator electrolyte of the generator. A thin layer of the first electrolyte wets and coats at least part of the surface of the particles of the active material, to protect the coated surface of the particles from passivation or degradation reactions, and to maintain the quality of ionic and electronic exchanges between the active material of the electrode and the other components of the composite. Further, the first electrolyte is impermeable to the components of the second electrolyte, and the second electrolyte is distributed in at least part of the composite to ensure the conductivity of the ions and acts as a deformable binder, preferably elastomeric, between the components of the composite electrode as well as with the current collector and the electrolyte separator of the generator.

In a second aspect of the present invention, there is provided a composite electrode comprising an active material, a current collector, a first mineral solid electrolyte and a second organic electrolyte, at least one of the first and the second electrolyte comprising at least one dispersed electronic conduction additive; the second electrolyte being in contact with the collector and acting as a deformable binder of the composite; wherein the first electrolyte coats at least part of the surface of the active material particles to protect the surface thereof from passivation or degradation reactions, and to maintain a quality of ionic and electronic exchanges between the active material and other components of the composite electrode, the first electrolyte being impermeable to the second electrolyte.

Finally, in a third aspect of the invention, there is provided a process for manufacturing an electrode according to the present invention, the process comprising the steps of:

a) mixing particles of electrode active material in an aqueous solution of the first mineral electrolyte comprising optionally a conduction additive;

b) drying the solution of step a) to obtain a powder of particles of the active material partially or completely coated with the first mineral electrolyte;

c) mixing the powder obtained in step b) with a second organic electrolyte optionally comprising a conduction additive; and d) spreading the mixture obtained in c) on a current collector.

In a preferred embodiment, the first electrolyte is a lithium ion conductor. In a further preferred embodiment, the first electrolyte is vitreous or partially vitreous and conducts lithium or potassium alkaline ions. In a further preferred embodiment, the first electrolyte mainly comprises lithium polyphosphate of approximate formula $(LiPO_3)_n$ wherein n>3, and has a minimal ionic conductivity of $10^{-10}$ S/cm at the operating temperature.

In another preferred embodiment of the invention, the conduction additive comprises carbon black, graphites, metals like silver and copper and semi-metallic compounds comprising carbides, nitrides, borides, and suicides in a dispersed form, and mixtures thereof.

In another preferred embodiment, the second electrolyte comprises:

a solvating polymer, dry or gelified by a polar aprotic solvent rendered conductive by the addition of a soluble lithium salt or a polyelectrolyte; or a gel comprising a low solvating polymer, a polar aprotic liquid solvent and a dissolved lithium salt.

The solvating polymer may be for example, a polymer electrolyte comprising a lithium salt and a homopolymer, a copolymer, a comb structure, or a network cross-linked or interpenetrated with a polyether. Preferably, the polymer electrolyte should adhere to the particles of the active material.

In a further preferred embodiment, the active material is used as the anode and comprises oxides, nitrides, carbon, graphites or mixtures thereof operating at a potential lower than 1.6 Volts versus a lithium metal electrode.

In a further preferred embodiment, the anode comprises lithium, a lithium alloy, a carbon or graphite insertion compound.

DETAILED DESCRIPTION OF THE INVENTION

The present invention relates to the optimisation of the performances and chemical and electrochemical stability of a composite electrode of a lithium generator, the electrode comprising a system with double solid electrolytes. The first electrolyte is a mineral solid, preferably vitreous and conducting $Li^+$ ions, used in a thin layer to wet and coat at least part of the active material of the electrode, to chemically stabilize the surface of the particles of the said material and maintain the quality of ionic and electronic exchanges with other components of the composite electrode. The second electrolyte is an organic electrolyte, preferably a dry or gelified polymer electrolyte, deformable, wherein the composite is distributed, this second electrolyte being used a binder of the active material particles of the electrode in contact with the first mineral electrolyte. An electronic conduction additive can be present in the first electrolyte, in the second electrolyte, or both, to facilitate the transport of ions and electrons. The first solid mineral electrolyte used in the present invention is chosen to be chemically compatible with the active material of the electrode, to prevent other components of the generator and/or the second organic electrolyte to be soluble therein. If that was the case, this would create passivation films or degradation products at the surface of the electrode active material.

The present invention further comprises means to embody vitreous solid electrolytes, composite electrode with solid double electrolytes and a generator.

Figure 2:
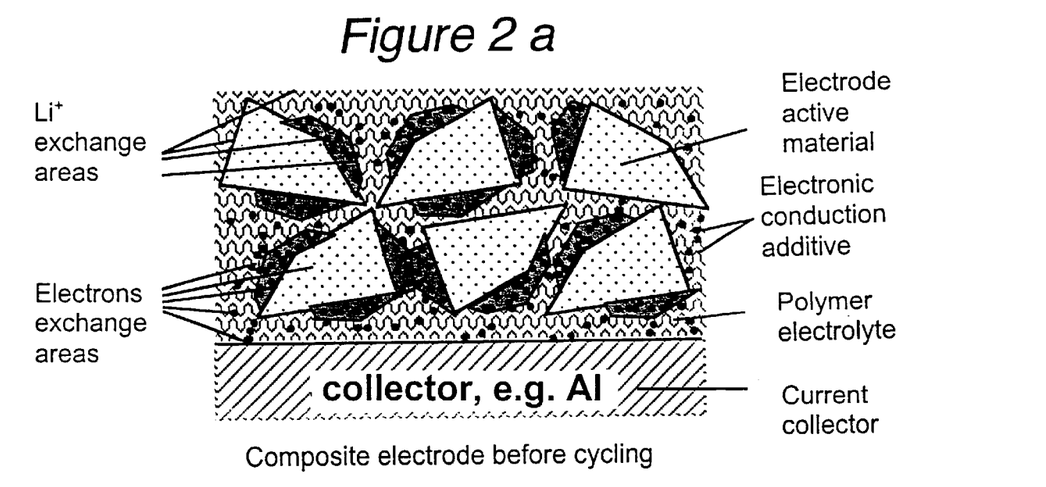
FIG. 2a illustrates an example of a composite electrode according to the present invention before cycling.
FIG. 2b illustrates the formation of passivation layers on a composite electrode according to the present invention after cycling.

By combining within the same electrode two types of solid electrolytes, that are distributed in the composite and having complementary roles, the present invention overcomes the prior art limitations. The first solid electrolyte is preferably vitreous and conductive for $Li^+$ ions, and is used at the surface of the electrode active material to wet at least in part the latter and thus protect the components of the second electrolyte, namely the polymer, the lithium salt or any other product in the solution. The fact that the vitreous solid electrolyte does not dissolve the components of the organic polymer electrolyte allows the protection of the coated surfaces, thus preventing the formation of passivation films that are harmful to proper electrical contacts, and undesirable degradations that diminish the efficiency of the electrical contacts. The layer of the vitreous electrolyte applied on the active material is preferably present in the form of a thin layer and contains, in a preferred embodiment, an electronic conduction additive dispersed therein to confer a mixed conductor character to the vitreous electrolyte, thus facilitating the electronic and ionic exchanges in the protected area. FIGS. 2a) and 2b) illustrate such an embodiment, wherein a conduction additive is present in the vitreous electrolyte and in the organic polymer electrolyte. In b), wherein the passivation films are shown, there is illustrated how the treatment of the particles of active material of the electrode protects certain areas of contact despite the ageing of the composite.

Further, the present invention comprises vitreous electrolytes compatible with a wide range of electrode active materials, namely with acidic oxides such as vanadium oxides $V_2O_5$, $V_6O_{13}$ and $LiV_3O_8$, that are otherwise incompatible with basic compounds such as silicates and polysilicates of alka line metals, because they react irreversibly with vanadium oxide. In the present invention, phosphates, polyphosphates, boratesi and polyborates of alkali metals, preferably lithium and potassium, and mixture thereof, represent preferred electrode materials. Various additives or agents known to stabilize the formation of glass can also be added to the vitreous electrolyte of the invention as long as they are not incompatible with the electrode materials. Examples of such glass forming agent include silica partially or completely hydrolysed, titanates, aluminates, siloxanes partially or totally hydrolysed, and mixtures thereof.

The invention also uses the enhanced conductive properties of the polymer electrolytes, gelified or not, to optimize the power performances of the composite electrode as long as the polymer electrolyte is distributed around the particles of the electrode active material and the electronic conduction additive, if any, to bind the particles together and with the electrode current collector. The polymer electrolyte of the composite, which acts as a binder, also ensures the adhesion and ionic exchanges with the electrolyte separator of the generator, preferably a polymer electrolyte-based film.

Figure 3:
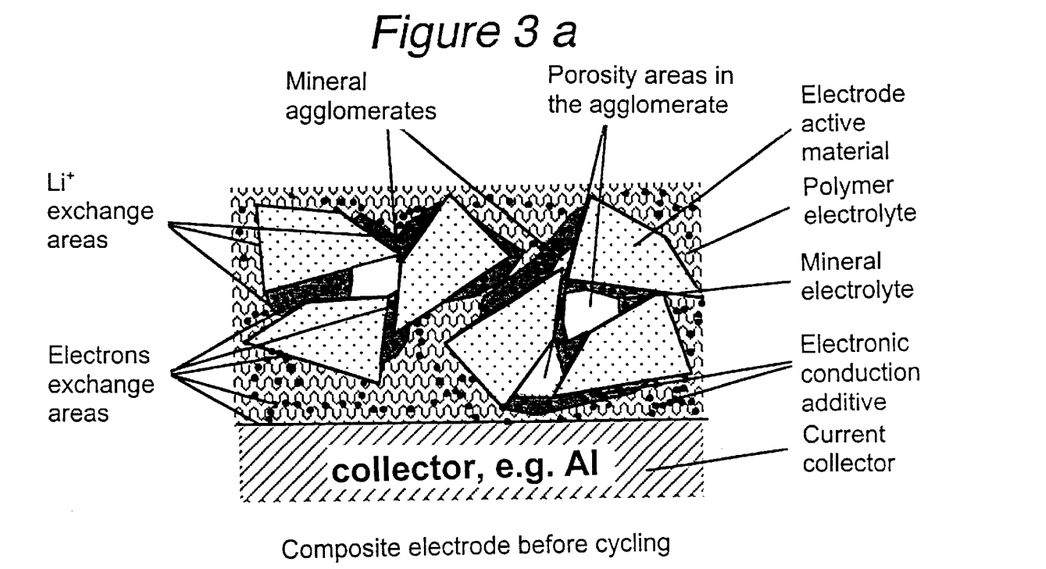
FIG. 3a illustrates a composite electrode according to the invention containing agglomerates of active particles before cycling.
FIG. 3b illustrates the formation of passivation layers on the electrode of FIG. 3a after cycling.

The present invention uses an aqueous process allowing the treatment of the active material of the electrode dispersed with the vitreous electrolyte in solution, optionally in the presence of a conduction additive, also dispersed. The solution is then either filtered and the residue dried, or spray-dried to form individual particles partially or completely wetted by the vitreous electrolyte, or agglomerated particles comprising the electrode material, the adhering glass and the electronic conduction additive, if any. The particles thus have a porosity rate more or less accessible to the polymer electrolyte when the latter is introduced. FIGS. 3a) and 3b) illustrate the formation of mineral agglomerates more or less porous and more or less penetrated with the polymer electrolyte. The agglomerated particles may be partially or completely penetrated by the polymer electrolyte, to reduce the surface of active material exposed to the polymer electrolyte.

The processes for forming composite electrodes from polymer electrolytes are known and can be adapted for the purposes of the present invention. One may use for example the application of polymer solutions, the application of molten polymers or the application of pre-polymers or less viscous low weight monomers, that will be cross-linked/polymerized after moulding in a composite form.

The use of the glass compositions using potassium is also included in the present invention as long as the potassium exchanges with the lithium and does not interfere with the operations of the lithium generator.

The following examples are provided to illustrate various preferred embodiments of the invention, and should not be construed as limiting its scope.

EXAMPLE 1

An aqueous solution of a vitreous mineral solid electrolyte of general formula $(LiPO_3)_n$ is prepared in the following manner. An aqueous solution of $(LiPO_3)_n$ is prepared by dissolving 75 g of polymetaphosphoric acid $((BPO_3)_n)$ in 325 g of water (some lower alcohol may also be added to the solution) and is then partly or completely neutralized by adding lithium hydroxide monohydrate $(LiOH.H_2O)$ in a molar ratio $(HPO_3)_n/LiOH$ of 1, corresponding to the addition of 39.6 g of $LiOH.H_2O$.

EXAMPLE 2

A dispersion comprising 0.25 g of $LiV_3O_8$ is agitated vigorously with 100 mL of the aqueous solution of $(LiPO_3)_n$ prepared in example 1. The dispersion thus prepared is of a brown typical of oxide $LiV_3O_8$. This observation demonstrates the chemical stability of the neutral aqueous solution of the solid electrolyte of the type $(MPO_3)_n$ where M is Li or K, with acidic electrode materials represented by $LiV_3O_8$. An identical solution comprising and excess of (LiOH) renders the solution greenish. The green color is probably caused by a reduced state of vanadium resulting from a possible decomposition of water in basic medium. Such an observation is also noted with $V_2O_5$ when treated with sodium silicate. The green color results from the basic effect of the silicates of alkaline metals and their incompatibility with oxides having an acidic character such as $V_2O_5$. An identical solution comprising an excess of acid $(LiPO_3)_n$ renders the solution orange, which is possibly associated to the formation of $V_2O_5$ following the probable formation of a vanadyl anion acid in the acidic medium.

EXAMPLE 3

Figure 4:
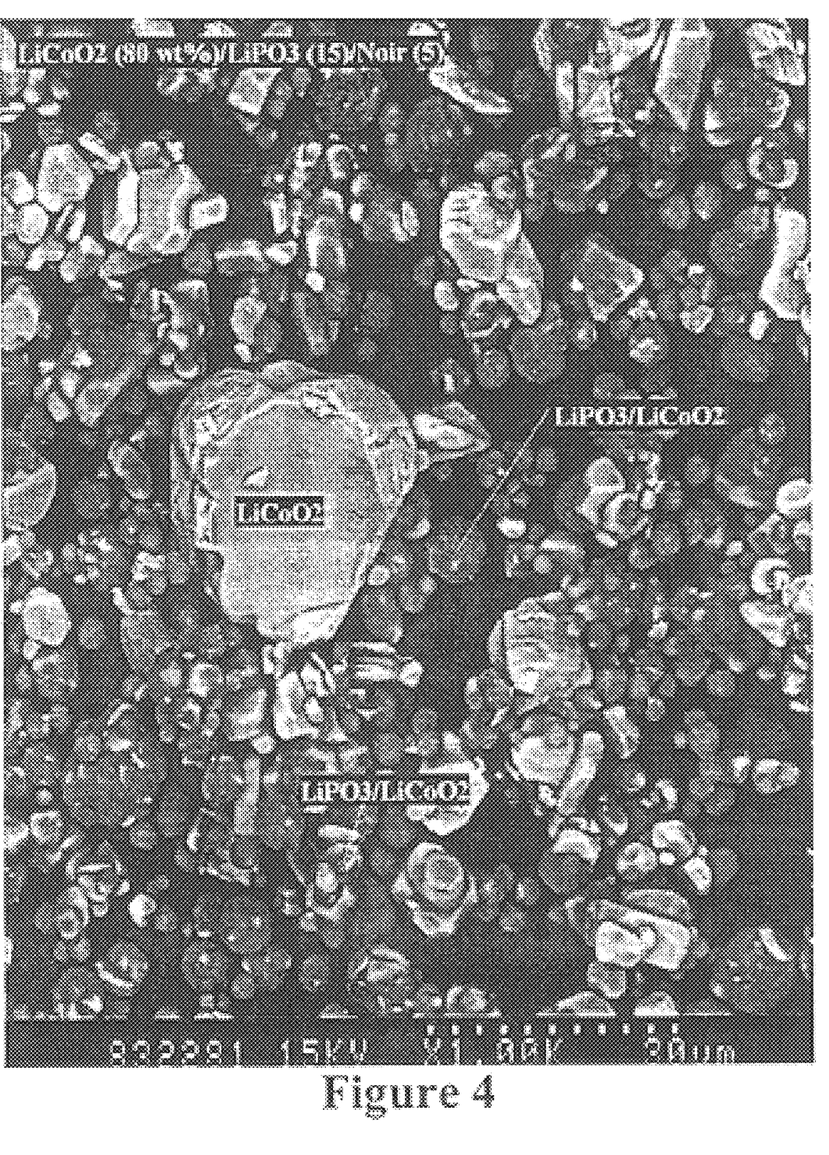
FIG. 4 illustrates a micrography of a $LiCoO_2$, $(LiPO_3)_n$ and carbon black powder obtained by spray drying.

93 g of polymetaphosphoric acid $(BPO_3)_n$ are dissolved in 6 litres of water, then neutralized with by adding 49 g of $LiOH.H_2O$ corresponding to a molar ratio $(HPO_3)_n/LiOH$ of 1. To this solution, 491 g of an aqueous dispersion of carbon black (Ketjenblack™ EC-600) containing 5% by weight of carbon black is mixed vigorously with the aqueous solution of lithium polymetaphosphate, and 1 kg of $LiCoO_2$ is added to complete the aqueous dispersion to be spray-dried. The dispersion is spray-dried in dry air with a Buchï model B-190™ (Brinkmann Instruments Division) spray dryer. The spray drying method used is that with a parallel current nozzle, i.e., the spray-dried product and the desiccating air both flow in the same direction. The micrography (FIG. 4) of the resulting powder show individual particles substantially coated with glass. The phosphorous analysis by Auger spectroscopy shows individual particles of $LiCoO_2$ substantially coated with glass as well as spheric droplets of $(LiPO_3)_n$ and carbon resulting from the non-optimized spray drying conditions.

EXAMPLE 4

Figure 5:
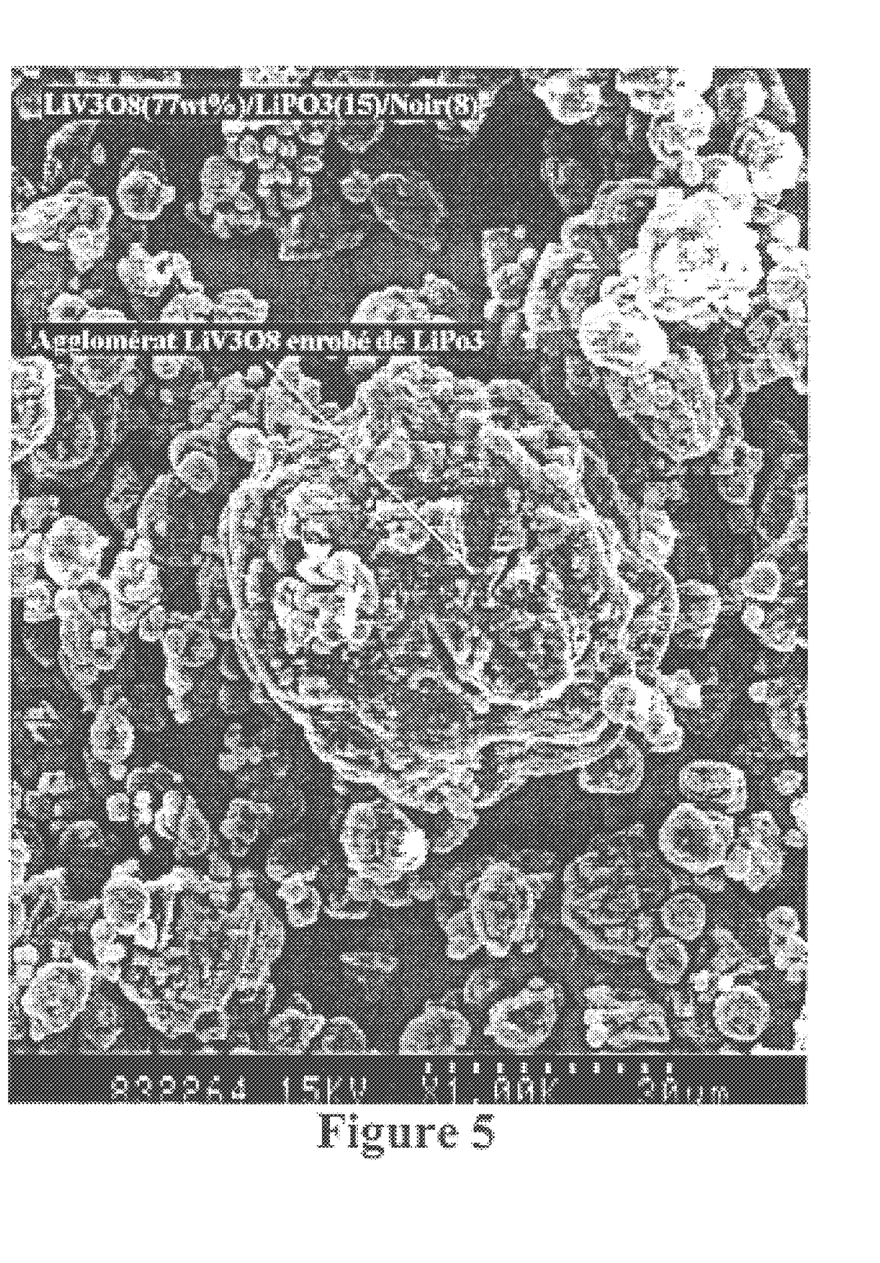
FIG. 5 illustrates a micrography of a $LiV_3O_8$, $(LiPO_3)_n$ and carbon black powder.

208 g of polymetaphosphoric acid $(HPO_3)_n$ are dissolved in 8.4 litres of water, then neutralized by adding 109 g of $LiOH.H_2O$ corresponding to a molar ratio $(HPO_3)_n/LiOH$ of 1. To this solution, 1.756 kg of an aqueous dispersion of carbon black (Ketjenblack™ EC-600) containing 5% by weight of carbon black is vigorously agitated with the aqueous solution of lithium polymetaphosphate, then 1.5 kg of $LiV_3O_8$ are added to complete the aqueous dispersion to be spray-dried. The dispersion is spray-dried in dry air in accordance with the procedure of Example 3 above. The micrography (FIG. 5) of the resulting powder shows agglomerates of $LiV_3O_8$ and vitreous electrolyte containing the electronic conduction additive. The powder, having a surface chemically stabilized by the vitreous electrolyte coating, comprises 15% volume $(LiPO_3)_n$, 8% of carbon black and 77% of $LiV_3O_8$.

EXAMPLE 5

208 g of polymetaphosphoric acid $(HPO_3)_n$ are dissolved in 8.4 litres of water, then neutralized by adding 109 g of $LiOH.H_2O$ corresponding to a molar ratio $(HPO_3)_n/LiOH$ of 1. To this solution, 1.756 kg of an aqueous dispersion of carbon black (Ketjenblack™ EC-600) containing 5% by weight of carbon black is vigorously agitated with the aqueous solution of lithium polymetaphosphate, and 1.5 kg of $V_2O_5$ is added to complete the aqueous dispersion to be spray-dried. The dispersion is spray-dried in dry air as described in Example 3 above. The micrography of the resulting powder shows agglomerates of $V_2O_5$ and vitreous electrolyte containing the electronic conduction additive. This result if similar to that observed in Example 4.

EXAMPLE 6

In this example, a composite cathode is obtained by using the particles of Example 4 to prepare, in a solvent followed by spreading in a single step, a composite electrode on an aluminium collector coated with a carbon-containing protective coating and an inert organic binder. This composite cathode is used for the manufacturing of an electrochemical generator according to the following steps.

The solution to be spread comprises a copolymer of ethylene oxide of molar weight of about 50 000 g/mol in solution in acetonitrile at a concentration of about 15% by weight and a salt of LiTFSI in a molar ratio of O/Li of 30/1 with respect to the polymer. The agglomerates particles of $LiV_3O_8$ and the vitreous electrolyte containing the electronic conduction additive, obtained in Example 4, are dispersed by mechanical agitation in the presence of carbon black (Ketjenblack™ EC600) and the suspension is spread on an aluminium collector coated with a carbon-containing protective coating and an inert organic binder. The composite cathode thus obtained is dried at 80° C. for 24 hours before being coupled with a lithium anode laminated beforehand with a polymer electrolyte of 15 microns acting as a separator, the latter being made of a copolymer of ethylene oxide containing a lithium salt LiTFSI at a concentration corresponding to a molar ratio O/Li of 30/1 with respect to the polymer.

When cycled at 80° C., this cell shows an initial use corresponding to the forecasted capacity of the cathode, which confirms that all the active matter is accessible by either solid electrolyte of the composite. This result confirms that this embodiment of the solid double electrolyte composite according to the invention allows the access of lithium ions to active material of the cathode even though both electrolytes, which have very different ionic conductivities, coexist in contact with the active material.

While the invention has been described in connection with specific embodiments thereof, it will be understood that it is capable of further modifications, and this application is intended to cover any variations, uses or adaptations of the invention following, in general, the principles of the invention, and including such departures from the present description as come within known or customary practice within the art to which the invention pertains, and as may be applied to the essential features hereinbefore set forth, and as follows in the scope of the appended claims.

What is claimed is:

1. An electrochemical generator comprising a cathode and an anode wherein at least one of which is a composite electrode comprising an active material, a current collector, and at least a first and a second solid electrolyte in the composite, at least one of the first and the second electrolyte comprising at least one dispersed electronic conduction additive; the first electrolyte being a mineral solid conductor, the second electrolyte being solid and organic; wherein a layer of the first electrolyte coats at least part of the surface of the particles of the active material, to protect the coated surface of the particles from passivation or degradation reactions, and to maintain the quality of ionic and electronic exchanges between the active material of the composite electrode and other components of the composite electrode, the first electrolyte being impermeable to the second electrolyte.

2. A generator according to claim 1 wherein the first electrolyte is a lithium ion conductor.

3. A generator according to claim 1 which is a lithium electrochemical generator.

4. A generator according to anyone of claim 1 wherein the first electrolyte is vitreous or partially vitreous and conducts lithium or potassium alkaline ions.

5. A generator according to claim 4 wherein the first electrolyte is partially vitreous and comprises alkali metals phosphates or polyphosphates, or mixtures thereof.

6. A generator according to claim 5 wherein the first electrolyte mainly comprises lithium polyphosphate of the formula $(LiPO_3)_n$ wherein n>3.

7. A generator according to claim 6 wherein $(LiPO_3)_n$ is soluble in water.

8. A generator according to claim 1 wherein the first electrolyte comprises a dispersed electronic conduction additive, and is a mixed ionic and electronic conductor.

9. A generator according to claim 1 wherein the second electrolyte comprises:
a solvating polymer, dry or gelified by a polar aprotic solvent rendered conductive by the addition of a soluble lithium salt or a polyelectrolyte; or
a gel comprising a solvating polymer, a polar aprotic liquid solvent and a dissolved lithium salt.

10. A generator according to claim 1 wherein the active material is part of the cathode.

11. A generator according to claim 10 wherein the active material comprises a vanadium oxide or mixtures of vanadium oxides.

12. A generator according to claim 1 wherein the active material is used as the anode and comprises oxides, nitrides, carbon, graphites or mixtures thereof operating at a potential lower than 1.6 Volts versus a lithium metal electrode.

13. A generator according to claim 1 wherein the current collector of the composite electrode is coated with a carbon-containing conductive coating comprising an adherent inert binder.

14. A generator according to claim 1 wherein the generator comprises a separator comprising at least one polymer electrolyte.

15. A generator according to claim 1 wherein the anode comprises lithium, a lithium alloy, a carbon or graphite insertion compound.

16. A composite electrode comprising an active material, a current collector, a first mineral solid electrolyte and a second organic electrolyte, at least one of the first and the second electrolyte comprising at least one dispersed electronic conduction additive; the second electrolyte being in contact with the collector; wherein the first electrolyte coats at least part of the surface of the active material particles to protect the surface thereof from passivation or degradation reactions, and to maintain a quality of ionic and electronic exchanges between the active material and other components of the composite electrode, the first electrolyte being impermeable to the second electrolyte.

17. An electrode according to claim 16 wherein the second electrolyte comprises a polymer electrolyte dry or gelified.

18. An electrode according to claim 16 wherein the first electrolyte is vitreous or partially vitreous and conducts lithium or potassium alkaline ions.

19. An electrode according to claim 18 wherein the first electrolyte is partially vitreous and comprises alkali metals phosphates or polyphosphates, or alkali metals borates, or mixtures thereof.

20. An electrode according to claim 19 wherein the first electrolyte comprises lithium polyphosphate of the formula $(LiPO_3)_n$ wherein n>3.

21. An electrode according to claim 20 wherein $(LiPO_3)_n$ is soluble in water.

22. An electrode according to claim 19 wherein the active material comprises a anadium oxide or a mixture of vanadium oxides.

23. A process for manufacturing an electrode according to claim 16 comprising:
   a) mixing particles of electrode active material in an aqueous solution of the first mineral electrolyte;
   b) drying the solution of step a) to obtain a powder of particles of the active material partially or completely coated with the first mineral electrolyte;
   c) mixing the powder obtained in step b) with a second organic electrolyte; and
   d) spreading the mixture obtained in c) on a current collector.

24. A process according to claim 23 wherein the aqueous solution comprises an alcohol.

25. A process according to claim 23 wherein the second electrolyte is deformable.

26. A process according to claim 23 wherein the second electrolyte comprises a dry or gelified electrolyte.

27. A process according to claim 23 wherein the first electrolyte is vitreous or partially vitreous and conducts lithium or potassium alkali ions.

28. A process according to claim 27 wherein the first electrolyte is partially vitreous and comprises alkali metals phosphate or polyphosphates, and mixtures thereof.

29. A process according to claim 23 wherein the first electrolyte comprises lithium polyphosphate of the formula $(LiPO_3)_n$ wherein n>3.

30. A process according to claim 29 wherein $(LiPO_3)_n$ is soluble in water.

31. A process according to claim 23 wherein the active material comprises a vanadium oxide or mixtures of vanadium oxides.

* * * * *

UNITED STATES PATENT AND TRADEMARK OFFICE
CERTIFICATE OF CORRECTION

PATENT NO.      : 6,492,061 B1
DATED           : December 10, 2002
INVENTOR(S)     : Gauthier et al.

It is certified that error appears in the above-identified patent and that said Letters Patent is hereby corrected as shown below:

Column 1,
Line 2, please insert the following paragraph:

-- The Government of the United States of America has rights in this invention pursuant to Cooperative Agreement No. DE-FC03-91CE50336 awarded by the U.S. Department of Energy. --

Signed and Sealed this

Twenty-second Day of April, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,492,061 B1
DATED          : December 10, 2002
INVENTOR(S)    : Gauthier et al.

It is certified that error appears in the above-identified patent and that said Letters Patent is hereby corrected as shown below:

Column 1,
Line 2, please insert the following paragraph:

-- The Government of the United States of America has rights in this invention pursuant to Cooperative Agreement No. DE-FC02-91CE50336 awarded by the U.S. Department of Energy. --

This certificate supersedes Certificate of Correction issued April 22, 2003.

Signed and Sealed this

Eighth Day of July, 2003

JAMES E. ROGAN
*Director of the United States Patent and Trademark Office*